United States Patent [19]

Gumbs

[11] Patent Number: 4,797,568

[45] Date of Patent: Jan. 10, 1989

[54] ELECTRONIC SWITCHING SYSTEM FOR CONTROLLING INDOOR AND OUTDOOR LIGHTS

[76] Inventor: Curtis M. Gumbs, 333 College Dr., Edison, N.J. 08817

[21] Appl. No.: 87,889

[22] Filed: Aug. 21, 1987

[51] Int. Cl.$^4$ ............................................. H01H 43/00
[52] U.S. Cl. ................................. 307/141; 307/132 E; 307/141.4; 307/141.8; 364/144
[58] Field of Search ................... 307/130, 131, 132 R, 307/132 E, 132 EA, 132 M, 141, 141.4, 141.8, 112, 115, 116; 364/143, 144, 145, 146; 200/38 F, 38 B, 38 D, 38 DA; 340/309.15, 825.07, 310 R, 310 A

[56] References Cited

U.S. PATENT DOCUMENTS

| | | | |
|---|---|---|---|
| 4,318,181 | 3/1982 | Kawakami et al. | 364/144 X |
| 4,354,120 | 10/1982 | Schornack | 307/132 E |
| 4,538,074 | 8/1985 | Fraden | 307/141 X |
| 4,570,216 | 2/1986 | Chan | 307/141.8 X |
| 4,672,232 | 6/1987 | Schoen | 307/132 E X |
| 4,712,019 | 12/1987 | Nilssen | 307/141.4 |
| 4,719,364 | 1/1988 | Pequet et al. | 307/141 |

Primary Examiner—William M. Shoop, Jr.
Assistant Examiner—Paul Ip
Attorney, Agent, or Firm—Arthur L. Lessler

[57] ABSTRACT

An electronic switching system, designed to automatically illuminate and delay in extinquishing 115V 60Hz outdoor/indoor lights and electrical wall receptacles. The system includes an automatic sensing circuit which detects open and closed circuits, at its input sense terminals wherein sensors are connected. An open detection illuminates lights and energizes wall receptacles connected to the system's input/output screw-type barrier block; and a closed detection thereafter keeps lights and wall receptacles supplied with 115V 60Hz for the duration of the delay adjust setting, then exitunquishing power. A regulation pin is incorporated for connecting an electronic clock for regulating the automatic sensing circuit's operation within a predetermined time. A manual power on/off circuit is also included, for operating the system independently of the automatic sensing. When placed in the "OFF" position the manual power on/off circuit initiates a delay in extinquishing 115V 60Hz. The system is mounted within an enclosure having input and output power cords protruding therefrom as a table model, and mounted on a modified switch face plate as a wall model.

26 Claims, 4 Drawing Sheets

ELECTRONIC SWITCHING SYSTEM FOR CONTROLLING INDOOR AND OUTDOOR LIGHTS

This invention relates to an electronic switching system, which will automatically illuminate and delay in extinquishing electrical outdoor and indoor lights and wall receptacles.

BACKGROUND OF THE INVENTION

Electrical lights, for example, porch and ceiling lights and electrical wall receptacles (in which the latter supplies power to, floor and table lamps) are normally operated by a toggle switch, in order to turn 'ON' or 'OFF' said lights, lamps and receptacles. The disadvantage to this conventional switching is that, upon entering a darkened room, one must fumble for the wall switch before the light can be turned 'ON', even if the toggle switch is located next to the door. Once the ceiling light is turned 'ON', one will need to go to another part of that room to turn 'ON' a second light, to be utilized in that desired area, and then return to turn 'OFF' the first light. Although very little energy is exerted to do so, it becomes a nuisance. When the task has been completed for which the intended purpose of the light was used, and the light is no longer warranted, instead of proceeding with the volley ball effect described above, one will try to exit the room in the dark. Another example would be; when a person is leaving the home, the porch light is turned 'ON' to illuminate the stairs, and a second person within the home must either stand by the porch light switch or remember at a later time that the porch light must be turned 'OFF'.

Up until now there has not been a switching system, which will automatically illuminate lights when a person enters a room. Furthermore, there is a need for a system which permits the person to transit from one room to another without proceeding with the "volley ball effect", utilizing a delay circuit to extinquish the lights. Nor has a manual power "ON/OFF" switch been incorporated which will permit a light switch to be placed in the 'OFF' position delaying the extinquishing of lights,in which the user may adjust the delay to a desired duration.

SUMMARY OF THE INVENTION

As herein described, there is provided an electronic switching system for controlling one or more lights, each light having at least one power supply terminal. The system includes manually operable bistable switching means for providing a control signal having an ON value and an OFF value. Bistable sensor condition detection means is responsive to the condition of at least one sensor for providing a detection signal having a first value indicative of the need for light, and a second value indicative of the absence of such a need. Power switching means is provided for supplying power to the power supply terminal in response to a lighting command signal. Means is included for providing the lighting command signal to the power switching means when the control signal has an ON value and also when the detection signal has its first value. A lighting turnoff delay control means is responsive to a transition of the control signal from an ON value to an OFF value, and also responsive to a transition of the detection signal from the first to the second value thereof for maintaining the lighting command signal for a predetermined duration after each transition.

BRIEF DESCRIPTION OF DRAWINGS

The invention will be better understood by referring to the schematic and drawings in which.

DETAILED DESCRIPTION OF PRESENT INVENTION

This invention relates to an electronic switching system, which will automatically illuminate and delay in extinquishing of, outdoor and indoor lights. For example, porch and ceiling lights, lamps, and electrical wall receptacles, that are normally operated by conventional wall switches within the home. The invention may be used with a conventionl wall receptacle, which is permanently energized.

Figure 1:
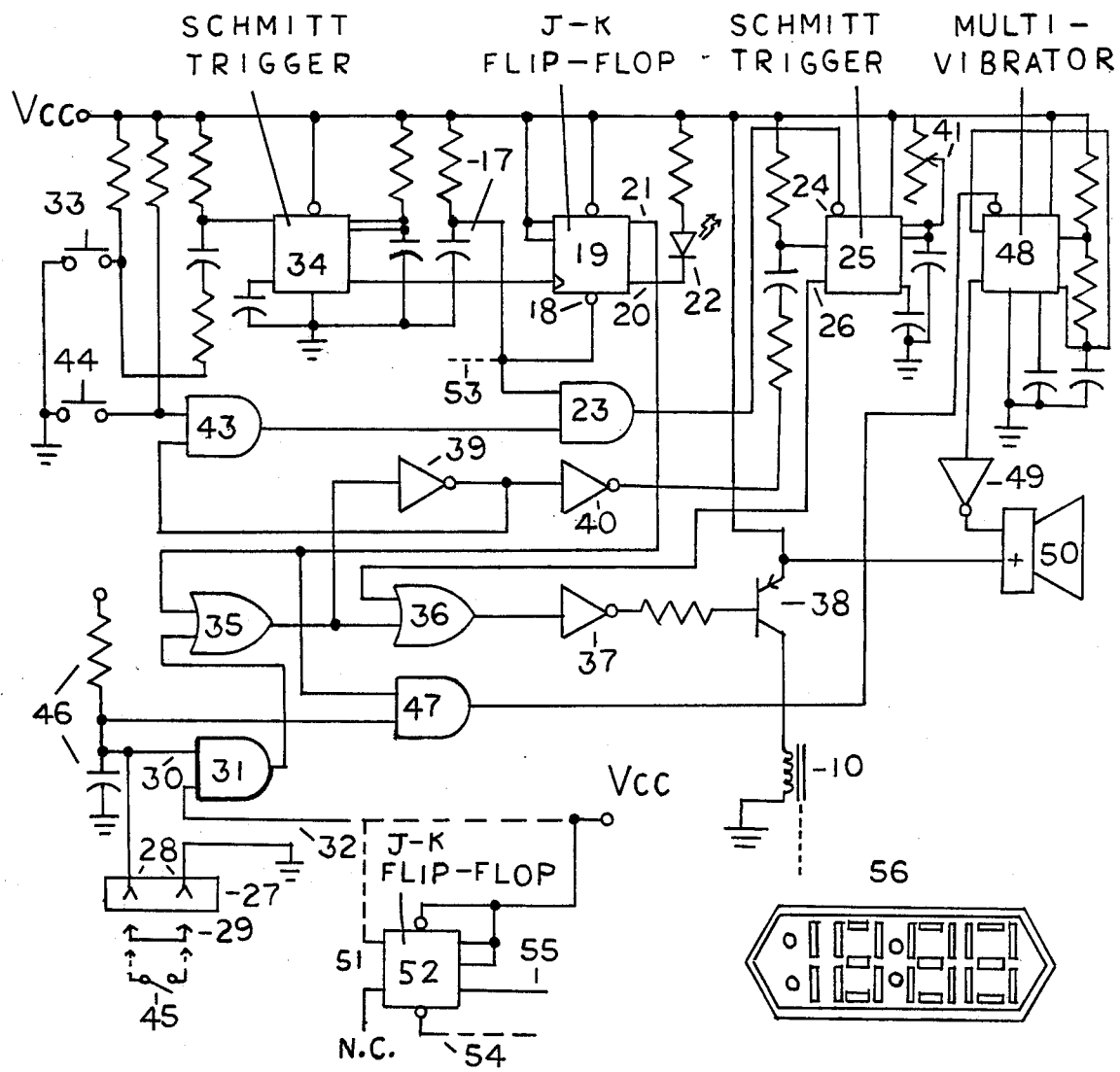
FIG. 1 is the schematic of an electronic switching system for controlling indoor and outdoor lights, according to a preferred embodiment of the present invention.
Figure 1:
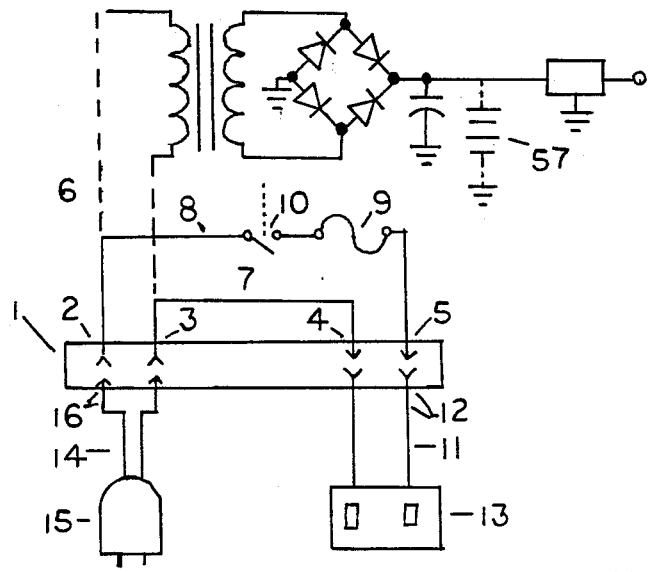

Referring first to FIG. 1, a screw-type barrier block 1 consisting of four screws 2 thru 5, (each having a post to connect wires to underneath) is used as a means of input and output of 115 V 60 Hz A.C. The power supply's transformer wires 6 are connected in parallel across the post of the power input screw terminals 2 and 3, to supply power to the integrated circuits via the power supply. A set of wires one black 8 and the other white 7, are also connected in parallel to the post of the power input screw terminals 2 and 3 respectively. The opposite end of the black wire 8 is connected in series with the relay's contact 10 and a fuse 9, and then connected to the post of the power output screw terminal 5. The opposite end of the white wire 7 is connected directly to the post of the power output screw terminal 4. The fuse is used to protect the relay's contact from reaching its maximum current capabilities when the relay's contact is closed. This supplies the 115 V 60 Hz across the power output screw terminals 4 and 5.

When floor or table lamps are to be operated directly, an output power cord 11 is used. One end of the output power cord 11 consist of fork terminals 12, which are connected in parallel to the power output screw terminals 4 and 5. The other end of the output power cord is connected to an output receptacle 13, in which a plug of a desired lamp is inserted.

The switch of the desired lamp, is then placed in the 'ON' position. An input power cord 14 consisting of a plug 15 (with one plug blade polarized) and fork terminals 16, is used to supply power to the barrier block 1. The fork terminal with the black wire, or "HOT WIRE", is connected to the power input screw terminal 2. The fork terminal with the white wire, or "NEUTRAL WIRE", is connected to the power input screw terminal 3. The plug of the input power cord, is then inserted into an electrical wall receptacle which is permanently energized. This causes a resistor and capacitor network 17 to generate a power-up reset pulse to a clear pin 18 of a J-K flip-flop 19, which forces the $\overline{Q}20$ and the Q21 outputs of the flip-flop 19 to a logic one and logic zero respectively. The logic one on the output of $\overline{Q}20$, is used to turn 'OFF' the manual power ON/OFF indicator 22.

This power-up reset pulse is also sent to the input of the "POWER UP RESET" AND gate 23. The logic zero from the output of this sme AND gate is then sent to a reset pin 24 of the first schmitt trigger 25, to set its output 26 to a logic zero. The output 26 is then sent to the second cascading OR gate 36 of the "RELAY DRIVE" circuit, which is inverted by inverter circuit 37 to keep the relay drive transistor 38 'OFF', which in turn keeps the relay 10 de-energized and also keeps the desired lamp from illuminating during the power up sequence.

When the invention is used in the MANUAL UNREGULATED-MODE a screw terminal strip 27 consisting of, two screws 28 is used as the input sensing terminals for the "AUTOMATIC SENSING" circuit. In this mode, the two input sense screw terminals 28 are temporarily shorted together by a jumper wire 29. This places a logic zero on the input pin 30 of the "AUTOMATIC SENSING" AND gate 31, in which the AND gate is used as the sense circuit. The other input of this same AND gate is used as an enable and disable pin 32 (which will be referred to as the regulation pin) and is connected to Vcc.

When the manual power ON/OFF switch 33 is depressed, a pulse is generated from the second schmitt trigger 34, which is then output to cause the J-K flip-flop's $\overline{Q}$ output 20 and Q output 21 to toggle from logic one and logic zero, to logic zero and logic one respectively. This toggle action causes the manual power ON/OFF indicator 22 to illuminate, due to the logic zero on the $\overline{Q}$ output 20. The Q output 21 which is at a logic one is then sent through two cascaded OR gates 35 and 36, which is then inverted by inverter 37 to turn 'ON' the relay drive transistor 38, which energizes the relay 10 to close the relay's contact. This will provide the 115 V 60 Hz present at the power input screw terminals 2 and 3 to be placed in parallel with the power output screw terminals 4 and 5 via black wire 8 and white wire 7, to illuminate the desired lamp via output power cord 11.

When the desired lamp is no longer warranted for the intended purpose for which it was turned 'ON', by depressing the manual power ON/OFF switch 33 once again, the first J-K flip-flop's $\overline{Q}$ output 20 and Q output 21 is caused to toggle from a logic zero and logic one respectively, back to a logic one and logic zero respectively. The logic one at the $\overline{Q}$ output 20 causes the manual power ON/OFF indicator 22 to extinquish. However, the high to low transition of the Q output 21 causes a high to low transition at the output of the first cascaded OR gate 35. This causes the output of the second cascaded inverter 40 to trigger the first schimitt trigger 25, which will generate a delay pulse, which is at a logic one from the output 26 of the delay circuit including Schmitt trigger 25. The duration of the logic one is equal to the desired time to which the delay adjust 41 has been set, according to the delay dial 42 illustrated in FIG. 2.

Referring back to FIG. 1, the delay pulse is ORed by the second cascading OR gate 36, which is inverted by inverter 37 to keep the relay drive transistor 38 'ON'. This will keep the relay 10 energized, and the desired lamp illuminated for the same duration as the delay pulse.

When the duration of the delay pulse equals the delay adjust time, the output 26 of the first schmitt trigger 25 will drop to a logic zero therefore permitting the relay drive transistor 38 to turn 'OFF', which de-energizes the relay 10 to extinquish the lamp.

To put it simply, if the delay pulse is equal to one minute, then the desired lamp will remain illuminated for one minute after the power ON/OFF switch has been placed in the 'OFF' position, and then extinquish.

Since the output of the first cascading OR gate 35 is now at a logic zero, the output of the first cascading inverter 39 will enable the "MANUAL DELAY RESET" AND gate 43, by placing a logic one at its input.

Therefore, if the desired lamp is to extinquish before the delay off sequence this is accomplished by depressing the delay reset switch 44. This will send a logic zero through, the "MANUAL DELAY RESET" AND gate 43 and the "POWER UP RESET" AND gate 23, to reset the output 26 of the delay circuit including Schmitt trigger 25 to logic zero. Since the two inputs of the second cascaded OR gate 36 are at a logic zero. The output of this same gate is inverted by inverter 37 to turn the relay drive transistor 38 'OFF', which de-energizes the relay 10 and causes the desired lamp to extinquish.

When the invention is used in the AUTOMATIC UNREGULATED-MODE, the regulation pin 32 of the "AUTOMATIC SENSING" AND gate 31 remains connected to Vcc. However, the jumper wire 29 is removed from the input sense terminals 28, and is replaced by a sensor 45, in which its wires are represented by dotted lines. (The sensor is used to simulate a door opening and closing due to a proximity switch mounted above a door, or a light beam being interupted, due to a photo control device mounted across a doorway. Furthermore, any electronic or mechanical sensor, whether commercially or otherwise available, that will provide an open and closed circuit across the input sense terminals for automatically operating the system may be utilized.) When the sensor 45 simulates an open, the capacitor, of the resistor and capacitor network 45, (providing a debounce for mechanical devices) will charge to a logic one. This logic one is detected by the inputs of the "MANUAL POWER ON" sensing AND gate 47, and the input 30 of the "AUTOMATIC SENSING" AND gate 31. The "AUTOMATIC SENSING" AND gate 31 will detect this logic one as an open, and will provide a logic one from its output. This logic one, is once again sent through two cascaded OR gates 35 and 36, and is inverted by inverter 37 to turn 'ON' the relay drive transistor 38, and energizes the relay 10 to illuminate the desired lamp. The desired lamp, however, will remain illuminated for as long as the "AUTOMATIC SENSING" AND gate 31 continues to detect this open.

Meanwhile, if the "MANUAL POWER ON" sensing AND gate 47 detects, that the manual power ON/OFF switch 33 is placed in the 'ON' position, the output of this same gate will send a logic one to a reset pin to enable the multivibrator circuit 48 to oscillate. The output of the multivibrator circuit, will then be inverted by inverter 49 which will permit an alarm 50 to emit an audible signal at the same frequency, as that of the multivibrator circuit for as long as the two conditions exist.

This audible signal is a reminder to the user, that the manual power ON/OFF switch 33 is in the 'ON' position and the system is not capable of entering a delay when a closed circuit is detected.

Therefore, the manual power ON/OFF switch must be placed in the 'OFF' position. Once the sensor 45 simulates a closed circuit, the capacitor of the resistor and capacitor network 46 will discharge through the short producing a logic zero condition. This logic zero will be detected by the input 30 of the "AUTOMATIC SENSING" AND gate 31 as a sensor closed, and will provide a logic zero from its output to the first cascaded OR gate 35. Once again, the high to low transition of the output of the first cascaded OR gate 35 will cause the first schmitt trigger 25 to generate a delay pulse from its output 26. This will keep the desired lamp illuminated for the same duration and then extinquish the lamp.

When the invention is used in the "AUTOMATIC REGULATED-MODE, the regulation pin 32 is disconnected from Vcc, and connected to the Q output 51 of a second J-K flip-flop 52. A wire 53 is then connected from the resistor and capacitor network 17 (which generates the power-up reset pulse) to the clear pin 54. This will force the Q output 51 to a logic zero, to disable the "AUTOMATIC SENSING" AND gate, and forces the Q output N.C. to a logic one during initial power up or restoration of power.

By setting the "SENSE ON and OFF" time of the electronic clock 56, and then setting the clock to the present time, the electronic clock 56 will then regulate the "AUTOMATIC SENSING" AND gate 31 within a predetermined time. For instance, when the present time equals "SENSE ON" time, the clock 56 will send a low to high transition to the clocking input 55 of the second J-K flip-flop 52, which then causes the Q output 51 to toggle from a logic zero to a logic one. This logic one will now enable the "AUTOMATIC SENSING" AND gate 31 to operate the system (in the manner previously described) up until the "SENSE OFF" time. When the present time equals the "SENSE OFF" time, the clock 56 will again send a low to high transition to the clocking input 55 of the J-K flip-flop 52, therefore causing the Q output 51 to toggle from a logic one back to a logic zero. This logic zero will then disable the "AUTOMATIC SENSING" AND gate 31 until the present time once again equals the "SENSE ON" time.

Figure 2:
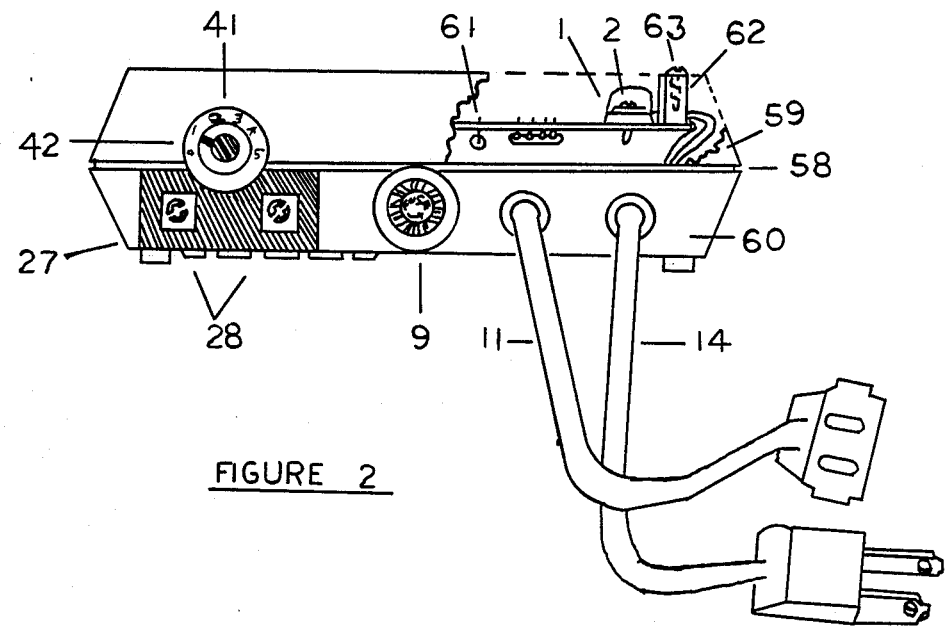
FIG. 2 illustrates a rear view of an enclosure (partially removed) housing the components of FIG. 1, for operating floor and table lamps directly.

The electronic switching system which has been described in detail, may receive its D.C. power from a battery 57. In FIG. 2, an enclosure 58 defined by top half 59 and bottom half 60 is used to mount a printed circuit board 61 which contains the circuit illustrated in FIG. 1. The input/output barrier block 1 is shown mounted on the etching side of the printed circuit board 61, along with four stand-offs 62 which are mounted in each corner and secured to the top half 59 using four screws 63. The shaft of the delay adjust 41, protrudes from an opening to permit the user to set the delay to the desired duration, using the delay dial 42 as a reference. The input sense terminal strip 27 is shown mounted to the bottom half 60 of the enclosure with its two input sense screw terminals 28 externally available to the user. Also protruding from the bottom half is a fuse 9, the output power cord 11, and the input power cord 14. The input and output power cords are then connected to their respective power screw terminals 2 thru 5.

Figure 3:
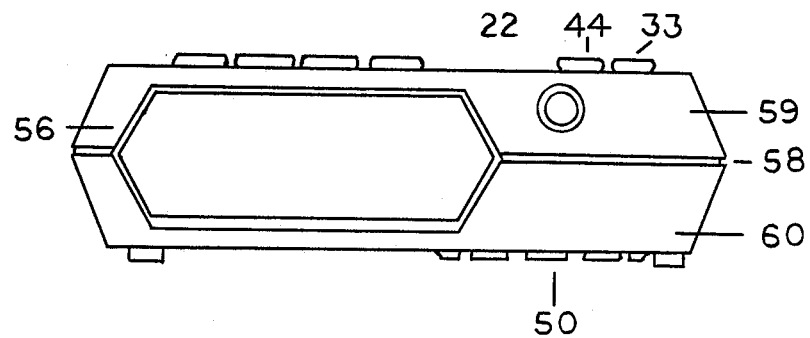
FIG. 3 illustrates a front view of the enclosure.

In FIG. 3, a front view of the enclosure 58 is shown. The power on/off switch 33 and the delay reset switch 44 both protrude from the top of the top half 59, with the power ON/OFF indicator 22 located below. When an electronic clock 56 is used to regulate the "AUTOMATIC SENSING" AND gate, the clock is mounted as shown, with its time setting switches located above. The alarm 50 which emits the audible signal, protrudes slightly from the bottom half 60. FIGS. 2 and 3 illustrate the an embodiment of invention as a table model for operating floor and table lamps directly. When the arrangement shown is to be used to operate outdoor/indoor lights and electrical wall receptacles, the white and black wires leading therefrom are used to electrically connect them to a source of A.C. power.

Figure 4:
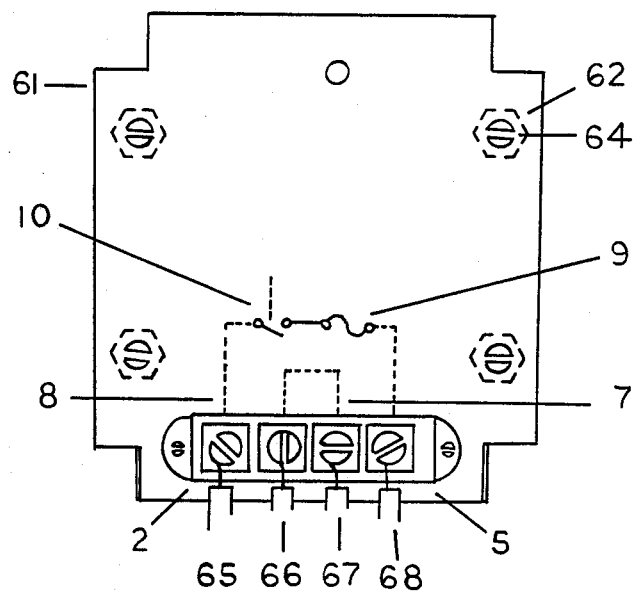
FIG. 4 illustrates a rear view of a modified face plate, showing the input/output barrier block's electrical connection.

In FIG. 4, the printed circuit board 61 is shown removed from the enclosure. The four stand-offs 62 which were mounted on the etching side, are now mounted on he component side, and secured in place by four screws 64. The black wire, "HOT" 65, and the white wire, "NEUTRAL" 66, which are connected to a 115 V 60 Hz A.C. source (located within the switch junction box) are connected to the power input screw terminals 2 and 3 respectively. The white wire 67 and the black wire 68 leading from the light fixture or wall receptacle to be operated by the circuit shown in FIG. 1, are connected to the power output screw terminals 4 and 5 respectively.

Figure 5:
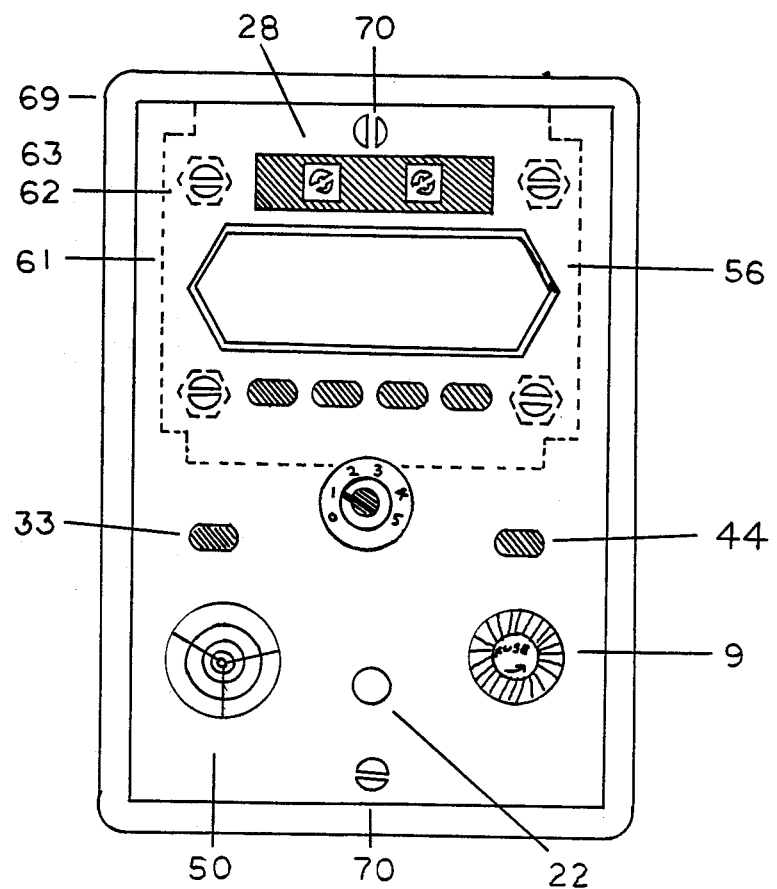
FIG. 5 illustrates a front view of a conventional wall switch face plate modified to operate porch and ceiling lights and electrical wall receptacles.
Figure 6:
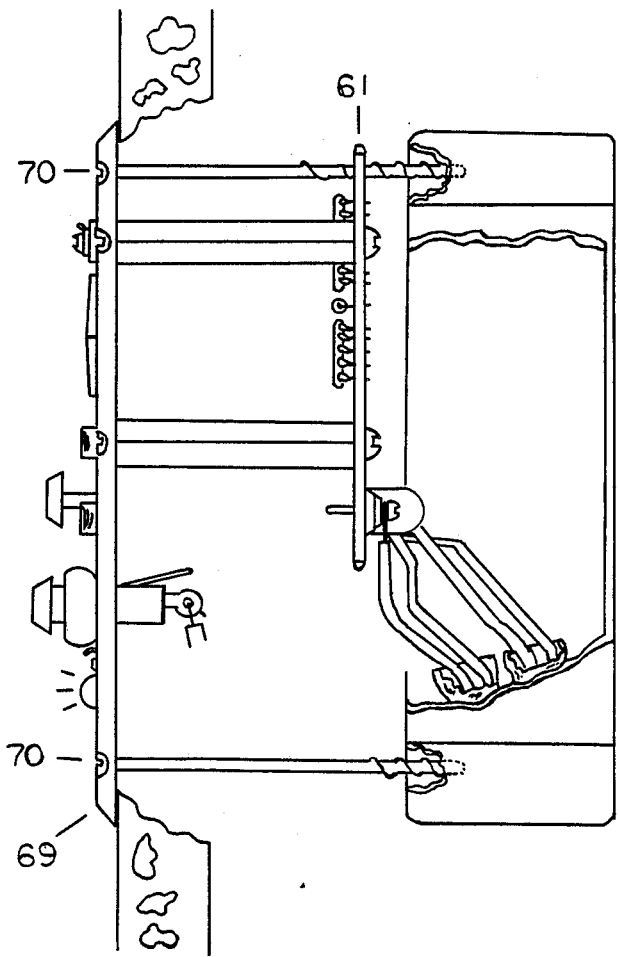
FIG. 6 illustrates a cross sectional view of the modified face plate mounted to the wall.

In FIG. 5, a wall switch face plate 69 has been modified to accept the components and printed circuit board illustrated in FIGS. 2 and 3. The four stand-offs 62 which point away from the printed circuit board 61, are shown mounted on the far side of the modified switch face plate, and secured in place by four screws 63, which enter from the front. Two screws 70, one located above the input sense screw terminals 28 and the other located below the power ON/OFF indicator 22, are used to secure the face plate to the wall, by entering the nut-type structure of the junction box, illustrated in FIG. 6. The modified face plate 69 is then placed against the wall, with the printed circuit board 61 inserted through the opening, in which the conventional wall switch was once mounted.

Referring back to FIG. 4 when the relay 10 now becomes energized wires 7 and 8 will place the 115 V 60 Hz, which is present at the power input screw terminals 2 and 3, in parallel with the power output screw terminals 4 and 5. This connection will then illuminate the porch or ceiling lights, or energize the electrical wall receptacle which supplies the 115 V 60 Hz to floor or table lamps.

I claim:

1. an electronic switching system for automatically illuminating and delay in extinguishing of outdoor/indoor lights and electrical wall receptacles, in which said system's integrated circuits and mounted on a printed circuit board, said system comprising:

an input/output barrier block having a pair of power input screw terminals and a pair of power output screw terminals, which comprises a screw-type barrier block having posts to connect a first set of wires underneath, a second set of wires one black one white, a relay, and a fuse, the screw-type barrier block being mounted on the etching side of the printed circuit board to receive and output 115 V 60 Hz and the second set of wires being connected in parallel to the posts of input and output terminals of the barrier block, with the relay and fuse in series with the black wire, so that energizing the relay places corresponding ones of the power input and output screw terminals in parallel;

a manual power on/off circuit;

an automatic sensing circuit;

means for generating a delay pulse;

a relay drive circuit which comprises a first OR gate cascaded to a second OR gate, a first inverter, and a relay drive transistor, whereby the first OR gate receives a logic one signal from the manual power on/off circuit and the automatic sensing circuits when said circuits are actuated, which signal is then cascaded to the second OR gate which also receives a delay pulse from said delay pulse generating means, and means for inverting the output of the second OR gate to turn 'ON' and 'OFF' the relay drive transistor to energize and de-energize the relay;

said means for generating a delay pulse being a delay circuit which comprises a first Schmitt trigger with a delay adjusting means, a manual delay reset AND gate cascaded to a power-up reset AND gate, and a second inverter cascaded to a third inverter, whereby the third inverter permits a high to low transition to be detected by the first Schmitt trigger, which generates a delay pulse having a corresponding delay value equal to the desired duration to which the delay adjusting means has been set, to keep the relay energized for the same duration and then to de-energize the relay;

said manual power on/off circuit comprising a first J-K flip-flop with $\bar{Q}$ and Q outputs, a manual power on/off indicator, a second Schmitt trigger, and a manual power on/off switch, interconnected so that depressing said switch generates a pulse from the second Schmitt trigger, which toggles and latches the J-K flip-flop outputs to 'ON' and 'OFF' conditions, with the power on/off indicator connected to the $\bar{Q}$ output and providing a visual indication of said condition;

said automatic sensing circuit comprising an automatic sensing AND gate, a resistor and capacitor network for mechanical debounce, and input sense terminals, so that sensors for automatically operating the system may be connected to said sense terminals and the state of said sensors may be detected by the automatic sensing AND gate as an open or closed circuit, which automatic sensing AND gate sends a logic one to the relay drive circuit for an open detection and a logic zero for a closed detection;

said manual power on/off circuit including a manual power 'ON' circuit which comprises a manual power 'ON' sensing AND gate, a multivibrator circuit, a fourth inverter, and an alarm, interconnected so that activating the relay drive circuit as a result of actuation of both the manual power on/off and automatic sensing circuits causes the alarm to emit an audible signal at the same frequency as the multivibrator circuit; and a power supply including a transformer, the transformer having power input wires connected in parallel with the posts of the power input screw terminals to supply power to the system's integrated circuits, the automatic sensing circuit including means to detect an open circuit condition at the input sense terminals so as to automatically illuminate lights in response to the open circuit condition, the delay circuit being responsive to initiation of a closed circuit condition at the input sense terminals to initiate the delay, the manual power on/off circuit permitting the outdoor/indoor lights and electrical wall receptacles to be operated independently of the automatic sensing circuit, the manual power 'ON' circuit causing an audible warning signal to be generated when the power on/off and the automatic sensing circuits are both activating the relay drive circuit, the delay circuit being responsive to the last high to low transition from the output of the first cascading OR gate to generate said delay pulse to keep the lights and wall receptacles illuminated or energized respectively for the duration of the delay and then to extinguish the same.

2. An electronic switching system as recited in claim 1, in which the printed circuit board is mounted within an enclosure defined by top and bottom surfaces and is used as a table model, for operating floor and table lamps directly.

3. an electronic switching system as recited in claim 1, in which the printed circuit board is mounted on the far side of a modified face plate as a wall model, for operating outdoor/indoor lights and electrical wall receptacles.

4. An electronic switching system as recited in claim 2, in which the input/output barrier block receives its 115 V 60 Hz from an input power cord comprising a plug, and fork terminals, whereby the fork terminals are connected to the power input screw terminals, with said cord protruding from an opening of the enclosure, for inserting the plug into a permanently energized wall receptacle.

5. An electronic switching system as recited in claim 4, in which the input/output barrier block outputs the 115 V 60 Hz from an output power cord comprising an output receptacle, and fork terminals, whereby said terminals are connected to the power output screw terminals, with said cord protruding from an opening of the enclosure for connecting the output receptacle to a plug of a desired lamp.

6. An electronic switching system as recited in claim 3, in which the input/output barrier block receives 115 V 60 Hz from the black and white wires connected to a source of A.C. and located within the junction box, and connected to the power input screw terminals.

7. An electronic switching system as recited in claim 6, in which the input/output barrier block outputs the 115 V 60 Hz to the white and black wires leading from the outdoor/indoor lights and electrical wall receptacles to be operated by the switching system and connected to the power output screw terminals.

8. An electronic switching system as recited in claim 1, in which said sensors for automatic operation include a proximity switch mounted above the door and connected to the input sense terminals, thereby opening the door automatically illuminates outdoor/indoor lights and energizes electrical wall receptacles.

9. An electronic switching system as recited in claim 8, in which said sensors for automatic operation include a photo controlled device mounted across the doorway and connected to the input sense terminals, thereby interrupting the beam automatically illuminates outdoor/indoor lights and energizes electrical wall receptacles.

10. An electronic switching system as recited in claim 9, in which said lights and receptacles will remain illuminated or energized respectively for as long as the automatic sensing circuit continues to detect an open its input sense terminals.

11. An electronic switching system as recited in claim 10, wherein a change from an open to a closed circuit condition at the input sense terminals results in a high to low transition detected by the delay circuit, said delay circuit responding to said change by keeping said lights and wall receptacles illuminated or energized respectively for the duration to which the delay adjusting means has been set and then extinguishing the supply of power to said lights and wall receptacles.

12. An electronic switching system as recited in claim 1, whereby the automatic sensing circuit includes a regulation pin connected to Vcc, wherein said connection permits said circuit open detection and automatic operation of lights at all times, in the automatic unregulated-mode.

13. An electronic switching system as recited in claim 12, further comprising a second J-K flip-flop and an electronic clock, the regulation pin being connected to the second J-K flip-flop, an output of the electronic clock also being connected to the second J-K flip-flop to control the second J-K flip-flop for operating in an automatic-regulated mode, whereby the electronic switching system responds only to those open and closed detections which occur within predetermined time periods determined by the electronic clock.

14. An electronic switching system as recited in claim 1, wherein placing the manual power on/off circuit in the 'OFF' condition creates a high to low transition detected by the delay circuit to keep lights and electrical wall receptacles illuminated or energized respectively, for the duration which the delay adjusting means has been set, and to terminate the illumination of said lights and the energization of said wall receptacles at the end of said duration.

15. An electronic switching system as recited in claim 1, further comprising means for temporarily bypassing the input sense terminals to cause the system to operate in a manual unregulated-mode, as a manual power on/off-delay system.

16. An electronic switching system as recited in claim 1, wherein the delay circuit further comprises a delay reset switch connected to the manual delay reset AND gate, whereby depressing said switch during a delay 'OFF' sequence immediately extinguish A.C. power to the lights and electrical wall receptacles.

17. An electronic switching system as recited in claim 1, in which the audible signal emitted from the alarm is a warning to the user that the power on/off switch was left in the 'ON' position.

18. An electronic switching system as recited in claim 1, in which said system receives its D.C. power from a battery.

19. An electronic switching system for controlling one or more lights, each light having at least one power supply terminal, said system comprising:
manually operable bistable switching means for providing a control signal having an ON value and an OFF value;
a bistable sensor condition detection means responsive to the condition of at least one sensor for providing a detection signal having a first value indicative of the need for light, and a second value indicative of the absence of such a need;
power switching means for supplying power to said power supply terminal in response to a lighting command signal;
means for providing said lighting command signal to said power switching means when said control signal has an ON value and also when said detection signal has said first value; and
lighting turnoff delay control means responsive to a transition of said control signal from an ON value to an OFF value, and also responsive to a transitiin of said detection signal from the first to the second value thereof for maintaining said lighting command signal for a predetermined duration after each said transition.

20. The switching system according to claim 19, further comprising manually operable means for resetting said lighting turnoff delay control means to cause said lighting turnoff delay control means to cease maintaining said lighting command signal.

21. The switching system according to claim 19, further comprising means for disabling said bistable sensor condition detection means to cause said system to operate in a manual mode.

22. The switching system according to claim 19, further comprising means for providing a warning when said control signal has an ON value and said detection signal simultaneously has the first value thereof.

23. The switching system according to claim 19, further comprising a clock, and means for enabling said bistable sensor condition detection means only during time intervals determined by said clock.

24. An electronic switching system for controlling one or more lights, each light having at least one power supply terminal, said system comprising:
manually operable bistable switching means for providing a control signal having an ON value and an OFF value;
bistable sensor condition detection means responsive to the condition of at least one sensor for providing a detection signal having a first value indicative of the need for light, and a second value indicative of the absence of such a need;
manually operable means for selectively disabling said bistable sensor condition detection means to cause said system to operate in a manual mode;
power switching means for supplying power to said power supply terminal in response to a lighting command signal;
means for providing said lighting command signal to said power switching means when said control signal has an ON value and also when said detection signal has said first value;
lighting turnoff delay control means responsive to a transition of said control signal from an ON value to an OFF value, and also responsive to a transition of said detection signal from the first to the second value thereof for maintaining said lighting command signal for a predetermined duration after each said transition; and
manually operable means for resetting said lighting turnoff delay control means to cause said lighting turnoff delay control means to cease maintaining said lighting command signal.

25. The switching system according to claim 24, further comprising means for providing a warning when said control signal has an ON value and said detection signal simultaneously has the first value thereof.

26. The switching system according to claim 24, further comprising a clock, and means for enabling said bistable sensor condition detection means only during time intervals determined by said clock.

* * * * *